Aug. 8, 1967     D. R. HILLIER ET AL     3,334,623
ELECTROCHEMICAL TRANSDUCER
Filed Nov. 2, 1964
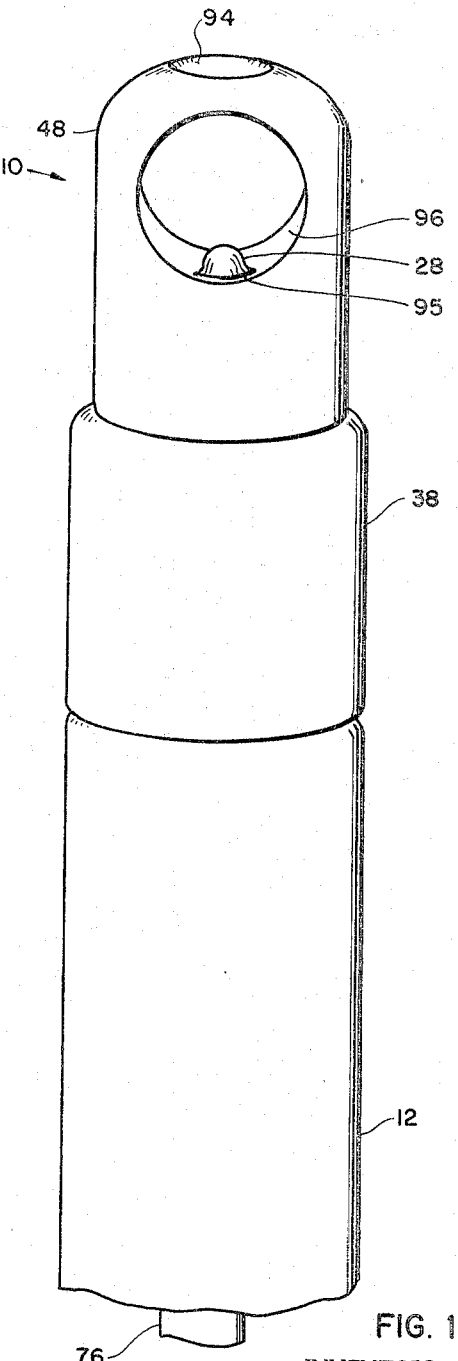
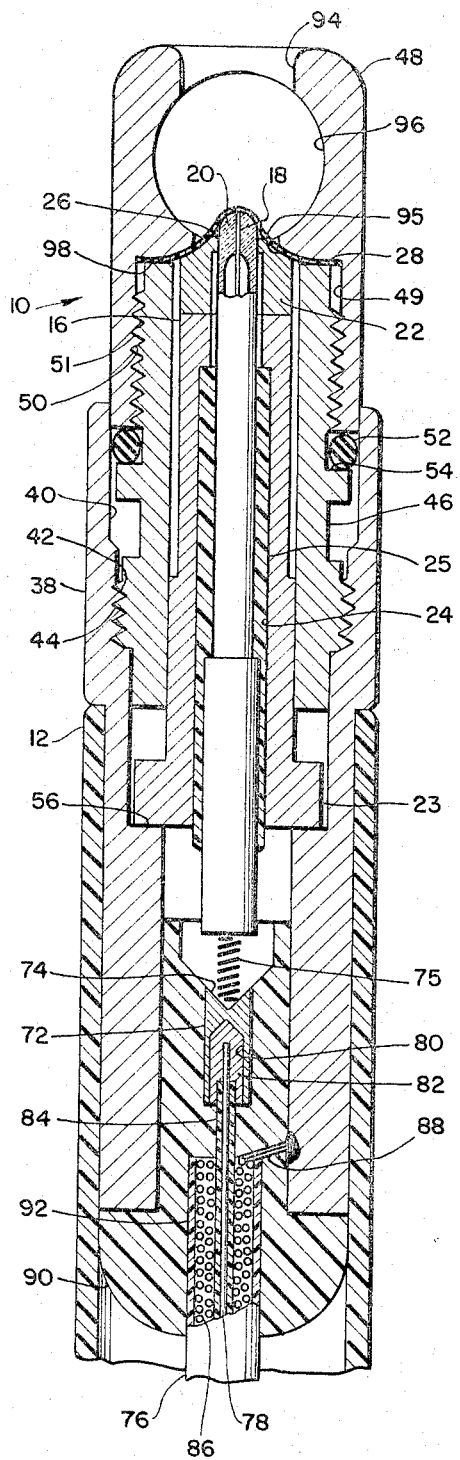
FIG. 1
FIG. 2
INVENTORS
DOUGLAS R. HILLIER
HENRY C. FAIGH
MAX TRAITE
BY *Thomas L. Peterson*
ATTORNEY

| United States Patent Office | 3,334,623 |
|---|---|
| | Patented Aug. 8, 1967 |

3,334,623
ELECTROCHEMICAL TRANSDUCER
Douglas R. Hillier, Palo Alto, and Henry C. Faigh and Max Traite, Sunnyvale, Calif., assignors to Beckman Instruments, Inc., a corporation of California
Filed Nov. 2, 1964, Ser. No. 408,227
6 Claims. (Cl. 128—2.05)

ABSTRACT OF THE DISCLOSURE

An electrochemical sensor having a membrane covering the sensing electrode is mounted in a catheter for in vivo analysis of body fluid. A cap protecting the forward end of the sensor is provided with passages permitting flow of body fluid past the membrane covered sensing electrode. The cap and sensor are also shaped to permit the use of flat membrane discs.

---

This invention relates generally to an electrochemical transducer for measuring a constituent in a sample and, in particular, to such a transducer for making in vivo measurements of a constituent in a body fluid or the tissue of a human or animal.

The present invention is an improvement of the electrochemical transducer disclosed in copending patent application Ser. No. 296,250, field July 19, 1963, now patent No. 3,259,124, assigned to the assignee of the present application. The aforementioned application discloses a miniaturized electrochemical sensor which is positioned in an elongated flexible tube of a very small diameter, generally referred to as a catheter, with the electrical conductors extending through the tube connecting the electrodes of the electrochemical sensor to a connector at the other end of the tube which is adapted to be connected to an external circuit. Such a device permits the making of rapid and accurate in vivo measurements of a constituent in a body fluid or tissue without requiring the withdrawal of the fluid from the subject being examined. Said transducer has the disadvantage, however, that inadequate means is provided for protecting the membrane covering the electrodes of the electrochemical transducer from bumping against hard objects or tissues in the body and, occasionally, clotting of the body fluid occurs about the sensing electrode of the transducer. Furthermore, the electrochemical transducer described in the aforementioned application requires that preformed membranes be employed in the construction disclosed which limits the material of the membrane to polyethylene since it is the only suitable material which can be easily preformed.

It is the object of the present invention to provide an electrochemical transducer, adapted to be used in a catheter for in vivo measurements of body fluid, with a cap which is so designed as to protect the forward end of the membrane covered sensing electrode from striking hard objects or tissues in the body into which the sensor is inserted and also to permit a free flow of body fluid through the cap and past the sensing electrode in such a manner as to prevent clotting of the body fluid adjacent the electrode.

Another object of the invention is to provide an electrochemical transducer constructed in such a manner so as to permit the use of membranes in the form of a flat disc rather than preformed, cup-shaped membranes as required in prior art devices.

According to the principal aspect of the present invention, an electrochemical transducer is provided comprising a pair of electrodes covered by a membrane permeable to the constituent in the fluid being measured and having a cap which extends forwardly of the electrodes. The cap is provided with a passage generally coaxial with the electrodes which passes through the cap and permits the flow of body fluid from the front of the sensor to the electrodes. A second passage extends laterally through the cap and intersects the first passage. The sensing electrode of the electrode pair extends also into the second passage so that body fluid may flow through the first coaxial passage, pass over the sensing electrode and exit from the cap through the lateral passage thus permitting a free flow of fluid through the sensor and preventing clotting of the fluid from occurring adjacent the sensing electrode.

According to another aspect of the invention, the electrochemical transducer and cap therefor are constructed in such a manner so that when the electrodes and cap are assembled together, a flat disc membrane may be held in place and stretched tightly over the electrodes thus eliminating the requirement of using a preformed membrane.

Other objects, aspects and advantages will become apparent from the following description taken in connection with the accompanying drawing wherein:

FIG. 1 is a greatly enlarged perspective view of an electrochemical sensor assembly embodying the novel cap construction of the present invention, with the sensor being mounted on a catheter but with the rear portion of the catheter and connector for the external circuit not being shown since it forms no part of the present invention; and FIG. 2 is a longitudinal cross-sectional view of the sensor assembly shown in FIG. 1.

The present invention will be described as a heart catheter having an electrochemical sensor assembly for measuring the oxygen tension or partial pressure of oxygen in the heart and major blood vessels of a living person or animal. However, it should be understood that the invention may be used in any situation in which an extremely small passage is permitted for the insertion of an electrochemical sensing device and where it is desired to measure a constituent in a particular fluid sample in situ.

Referring now to the drawing in detail, there is shown an electrochemical sensor assembly, generally designated by numeral 10, connected at the forward end of a catheter 12 which receives at its rear end a connecting device (not shown) for connecting the sensor assembly to an external circuit. The electrochemical sensor assembly receives an electrode assembly, generally designated by numeral 16, which is shown as being a miniaturized polarographic electrode device.

The electrode assembly 16 comprises a central platinum wire cathode or sensing electrode 18 surrounded by a glass sleeve 20. The platinum wire extends through the forward end of the glass sleeve leaving an exposed surface which is flush with the surface of the glass. A silver anode 22 in the form of an annular ring surrounds the forward portion of the glass sleeve 20. The anode 22 is soldered to a stainless steel sleeve 23 which has its forward portion surrounding the glass sleeve 20 and contacting the sleeve with its rear portion being spaced from the glass sleeve providing an annular passage 24 which is filled with a nonconducting potting material 25. The forward portion of the anode 22 is spaced slightly rearwardly of the forward part of the glass sleeve 20 to provide an annular space or reservoir 26 for containing electrolyte which forms a bridge between the two electrodes. A membrane 28 is disposed over the forward ends of the two electrodes, the sleeve 20 and electrolyte reservoir 26 to separate the electrodes and electrolyte from the sample in which the transducer is placed for analysis purposes.

For the analysis of the oxygen content of blood, the membrane may be polyethylene, polyvinyl chloride, tetrafluoroethylene or polypropylene. These materials are oxygen permeable and permit the transmission of oxygen to the interior of the electrode assembly while forming a barrier to other substances which would affect the electrical characteristics of the assembly. Sodium or potassium chloride solutions are suitable as electrolytes to be provided in the reservoir 26. Alternatively, any of a variety of suitable buffer solutions could be used. Moreover, various other materials other than silver and platinum could be used for the electrodes 18 and 22 as is well-known in the art.

In operation of the electrode assembly 16, the electrolyte provides for the flow of electrons in the electro-reduction and electro-oxidation processes used in polarography. For example, in the determination of oxygen content of an alkaline sample, oxygen diffusing through the membrane 28 is reduced at the platinum sensing electrode according to the reactions:

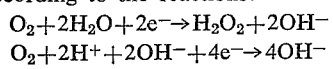

In acid media, the reaction may be written as:

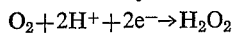

Thus, the electrical characteristics of the electrode assembly will be affected in proportion to the quantity of the oxygen which passes through the membrane. The current traversing the electrodes will vary in direct proportion to the quantity of oxygen striking the platinum cathode, the cell being polarized at the predetermined applied voltage (0.7 volt) in the absence of oxygen and being depolarized when oxygen is present to be reduced at the cathode.

The electrode assembly 16 may be made very small. For example, the electrode assembly of the invention has been made .390 inch in length and approximately .059 inch at the widest diameter. In such assembly, a .001 inch diameter platinum cathode wire was utilized in the center of a .013 inch outer diameter piece of glass tubing 20. The polyethylene membrane 28 covering the electrodes was 1 mil thick.

The electrochemical sensor assembly 10 is connected to the catheter 12 by means of a cylindrical housing 38 which is frictionally fitted in the end of the catheter tubing 12 and remains with the tubing when the sensor assembly is removed from the catheter. The housing 38 has a recess 40 in its forward end and a screw threaded portion 42 which receives a screw threaded portion 44 of an intermediate sleeve 46 which surrounds the stainless steel sleeve 23 and is supported by the sleeve 23 at its rear end.

A cap 48 is provided for the electrode assembly 16 and forms the novel feature of the present invention. The cap will be described in further detail below but for the present discussion it is seen that the cap has a recess 49 in its rear end and screw threads 50 engaging screw threads 51 on the outer surface of the sleeve 46. An O-ring 52 is positioned in an annular groove 54 provided in the outer surface of the sleeve 46 and is abutted by the rear portion of the cap 48 when the cap is screw threaded on the sleeve 46 thus resulting in compression of the O-ring and a sealing of the internal portion of the sensor assembly 10. The housing 38 is provided with a shoulder 56 which provides a stop for the rear portion of the sleeve 23 when the sensor assembly 10 is screw threaded into the housing.

In order to electrically connect the anode and cathode of the electrode assembly 16 to an external circuit at the rear end of the catheter 12, there is provided within the rear portion of the electrode housing 38 a cylindrical conducting member 72 having a forward conical concave surface 74. A conductor 75 in the form of a coil spring extends from the rear end of the glass sleeve 20 and is held therein by a suitable potting means (not shown). The coil spring 75 is connected to the platinum wire 18 near the rear of the glass sleeve 20 so as to provide electrical contact at the rear of the sensor assembly 10 for the cathode. The member 72 is coaxial with the platinum cathode 18 and the conductor 75 so that upon threading of the sensor assembly 10 into the housing 38 the spring conductor 75 is brought into contact with the member 72. The coil spring 75 is preferably of sufficient length that it will be compressed when the rear portion of the sleeve 23 abuts against the stop 56 when the sensor assembly 10 is screw threaded into the housing 38.

A coaxial cable 76 extending through the length of the catheter 12 includes a central inner conductor member 78 which extends into a rear recess 80 in member 72 and is electrically connected thereto by means of solder 82 or the like. An insulating sleeve 84 of Teflon or like material covers the inner conductor 78, and an outer concentric conductor 86 in the form of a double strand of spirally wound wire covers sleeve 84. A forward portion 88 of the outer conductor 86 is bonded by soldering or the like to the rear portion of the housing 38. Since the housing 38 directly contacts the stainless steel sleeve 23 and also is connected thereto through the intermediate sleeve 46, electrical contact is made between the silver anode 22 soldered to the forward end of the sleeve 23 and the outer conductor 86 of the coaxial cable. An insulating potting material 90 completely fills the area in the rear portion of the housing 38 to provide electrical insulation and to concentrically align the coaxial cable 76 and member 72 with spring 75 and the electrodes 18 and 22. An insulating covering 92 covers the coaxial cable from the housing 38 to the rear of the catheter 12. The two conductors 78 and 86 are connected to a suitable connector at the rear end of the catheter (not shown) for connecting to an external circuit.

For the catheter 12, Teflon tubing has been used for this device. The outer diameter of the tubing is only .092 inch while the inner diameter is .069 inch. The outer diameter of the housing 38 is also approximately .092 inch. Thus, the outer diameter of the instrument is of such a size as to permit the insertion of the electrochemical sensor assembly 10 and catheter 12 into the heart, arteries or veins of a living subject. A convenient length for the catheter is 125 centimeters. This length is sufficient for use in full grown humans and permits entry into the femoral vein or artery.

Referring now to the cap 48 which is the novel feature of the present invention, there is provided an opening 94 in the forward end of the cap which, together with the opening 95 in the rear portion of the cap, provides a central passage coaxial with the electrodes 18 and 22. A second passage 96 extends laterally through the cap 48 and intersects the first passage defined above. The forward portion of the cathode 18 covered by the membrane 28 extends into the lateral passage 96. When the catheter with the sensor assembly 10 is inserted into a body for in vivo measurements of the partial pressure of oxygen, the body fluid will enter one of the openings in the cap and pass over the membrane covered cathode 18 and exit from the cap. Consequently, there is provided a cap structure which permits the free flow of fluid over the sensing electrode 18. Preferably, the passages 94 and 96 are of sufficiently large size to permit the free flow of fluid therethrough without clotting occurring of the body fluid in the passages or about the sensing electrode. Furthermore, the cap construction of the invention has the advantage that the forward end of the cap extends forwardly and partially over the electrode assembly 16 so as to provide a protective front end which will prevent the membrane 28 from bumping against hard objects or tissues when the catheter is inserted into the body.

Another important feature of the invention is the provision of means whereby the periphery of a flat disc of membrane material may be held so that the electrode assembly may be forced against the center of the disc to deform the disc in place. The means providing this result includes the intermediate sleeve 46 and the curved rear surface 98 on the cap 48 which is continuous from the opening 95 and extends first rearwardly and then radially outwardly. When the electrode assembly 16 and cap 48 are assembled, a flat disc membrane 28 may be mounted in the bottom of cavity 49 in the cap. The cap 48 is then threaded onto the sleeve 46 so that the periphery of the membrane is tightly held between the two. The electrode assembly 16 is then pushed into position through cavity 24 and, as it advances, the membrane material is deformed in place around the electrode tip and over the cathode 18. This eliminates the problem of having to provide preformed membranes to mount over the cathode 18 and anode 22, as required in prior art devices of this nature, and further permits a wider variety of membrane materials to be used. As stated before, polyethylene is the only material which may be readily formed into preformed cup-shaped membranes whereas such limitation does not exist by utilizing the novel cap construction of the present invention. It can be appreciated that the novel rear end configuration of the cap 48 and sleeve 46 is not necessarily limited for use in an electrode assembly mounted in a catheter, but such feature may also be applied to any electrochemical sensor utilizing a pair of electrodes covered with a membrane when it is desired to form the membrane in place rather than preform the membrane.

It should be further understood that any suitable electrochemical sensor besides an oxygen sensor may be employed in the present invention. As for example, oxygen-reduction electrodes for chloride and quinone-quinhydrone electrodes for hydrogen-ion concentration measurements could be used provided that the membrane is permeable to the diffusing substance of interest and that appropriate electrochemical system be employed within the membrane to detect the substance, its reaction products or the effect of the diffusing substance upon the electrochemical system. For example, the detection and determination of dissolved $CO_2$ by its alteration of the pH of a suitable electrochemical system through the formation of carbonic acid could be utilized. As an alternative to the quinhydrone system, the internal electrodes for pH might consist of a pH glass electrode system. In another application, the sensing electrode may be responsive to hydrogen gas rather than oxygen by reversing the polarity of the electrodes of the system shown in the drawing and by impressing 0.8 volt rather than 0.7 volt across the electrodes.

Although the present invention has been described as being ideally suited for physiological measurements, the invention has applications for the same general use in any system where access may be limited, particularly through a tubular passage or where remote reading is desirable.

Although several embodiments of the invention have been disclosed herein for purposes of illustration, it will be understood that various changes can be made in the form, details, arrangement and proportions of the various parts in such embodiments without departing from the spirit and scope of the invention as defined by the appended claims.

What is claimed is:

1. In an electrochemical sensor adapted to have its rear end mounted in the end of a catheter for making in vivo measurements of a constituent in a body fluid or the like, the combination of:
   a pair of electrodes adapted to be joined by an electrolyte;
   a membrane permeable to the constituent being measured overlying the forward end of said electrodes for separating said electrodes and electrolyte from the body fluid; and
   a cap mounted on and extending forwardly of said electrodes, said cap having passage means therein opening through its forward end, communicating with the portion of said membrane overlying one of said electrodes and exiting through the side of said cap.

2. In an electrochemical sensor adapted to have its rear end mounted in the end of a catheter for making in vivo measurements of a constituent in a body fluid or the like, the combination of:
   a pair of electrodes adapted to be joined by an electrolyte;
   a membrane permeable to the constituent being measured overlying the forward end of said electrodes for separating said electrodes and electrolyte from the body fluid;
   a cap mounted on and extending forwardly of said electrodes, said cap having a first passage therein opening through its forward end and communicating with the portion of said membrane overlying one of said electrodes;
   said cap having a second passage extending laterally therethrough and intersecting said first passage; and
   the forward end of said one of said electrodes extending into said second passage.

3. In an electrochemical sensor adapted to have its rear end mounted in the end of a catheter for making in vivo measurements of a constituent in a body fluid or the like, the combination of:
   first and second electrodes adapted to be joined by an electrolyte;
   said first electrode surrounding and being concentrically mounted with respect to said second electrode and spaced therefrom;
   a membrane permeable to the constituent being measured overlying the forward end of said electrodes for separating said electrodes and electrolyte from the body fluid;
   a cap mounted on and extending forwardly of said electrodes, said cap having a first passage therethrough coaxial with and receiving the forward end of said second electrode;
   said cap having a second passage extending laterally therethrough and intersecting said first passage; and
   said forward end of said second electrode extending into said second passage.

4. An electrochemical sensor as set forth in claim 3 wherein said passages are sufficiently large in cross-section to permit free flow of body fluid therethrough without clotting of the fluid occurring in said passages.

5. An electrochemical sensor as set forth in claim 3 wherein said cap has a rear curved surface continuous with said first passage and extending first rearwardly and then radially outwardly from the longitudinal axis of said electrodes; and
   means behind the radially outwardly extending portion of said rear curved surface and cooperating therewith to hold the periphery of said membrane in place, whereby said membrane may be deformed in place when said forward end of said second electrode is pushed into said second passage during assembly of said sensor.

6. An electrochemical sensor for measuring a constituent in a sample comprising:
   first and second electrodes adapted to be joined by an electrolyte;
   said first electrode surrounding and being concentrically mounted with respect to said second electrode and spaced therefrom, the forward end of said second electrode being positioned forwardly of the forward end of said first electrode;
   a membrane permeable to the constituent being measured overlying the forward end of said electrodes for separating said electrodes and electrolyte from the sample;
   a cap mounted on said electrodes having an opening therethrough coaxial with said electrodes with said second electrode extending into said opening, said cap having a rear curved surface continuous with said opening and extending first rearwardly and then radially outwardly from the longitudinal axis of said electrodes; and means behind the radially outwardly extending portion of said rear curved surface and cooperating therewith to hold the periphery of said membrane in place, whereby said membrane may be deformed in place when said forward end of said second electrode is pushed into the opening of said cap during assembly of said sensor.

References Cited

UNITED STATES PATENTS

| | | | |
|---|---|---|---|
| 1,900,286 | 3/1933 | Huber et al. | 128—2.05 |
| 2,555,937 | 6/1951 | Rosenthal et al. | 175—183 |
| 2,637,316 | 5/1953 | Grez | 128—2.1 |
| 2,756,203 | 7/1956 | Gilbert | 204—195 |
| 3,098,813 | 7/1963 | Beebe et al. | 204—195 |
| 3,259,124 | 7/1966 | Hillier et al. | 128—2.1 |

RICHARD A. GAUDET, *Primary Examiner.*

SIMON BRODER, *Examiner.*